3,190,356
METHOD OF CEMENTING WELLS
Horace J. Beach, Cypress, Tex., assignor to Gulf Oil Corporation, Pittsburgh, Pa., a corporation of Pennsylvania
No Drawing. Filed Aug. 16, 1962, Ser. No. 217,291
2 Claims. (Cl. 166—31)

This invention relates to cement compositions and particularly to compositions to be incorporated in Portland cement used in oil and gas wells. The invention is especially useful in counteracting the effects of drilling mud chemicals which may contaminate Portland cement slurries used for setting casing, liners, or plugs in such wells.

In the drilling of wells by the rotary drilling method, a drilling mud is circulated down the drill pipe and upwardly through the annulus between the drill pipe and the borehole wall to carry the cuttings from the borehole. Another important function of drilling muds is to keep the borehole full of a liquid which exerts a hydrostatic pressure opposing entry of underground formation fluids into the borehole. Drilling muds are aqueous liquids, oils, or emulsions of aqueous liquids and oils which frequently contain a substantial concentration of organic chemical additives to give the drilling mud desired physical and chemical properties. Such additives are, for example, frequently added to drilling muds to modify the viscosity and water-loss characteristics of the drilling mud and to inhibit hydration of shales penetrated during the drilling the well.

After drilling has been completed, or at an intermediate period during the drilling of the well, it may be necesssary to set casing in the borehole or set a plug of cement for a whipstocking operation. The setting of casing is accomplished by pumping cement down through the casing and displacing it upwardly through the annulus between the casing and the borehole wall. A plug is set in the borehole of a well by pumping a cement slurry into the lower end of the borehole through tubing which is withdrawn from the borehole before the cement sets. Although cementing operations are accomplished in a manner to displace drilling mud from the borehole ahead of the cement, there is substantial mixing of the drilling mud and cement after the cement slurry leaves the tubing or casing through which it is pumped to the desired location. The mixing is especially serious in plug setting operations. Cement slurries are capable of withstanding dilution to as much as 60 or 70 percent of the volume of the cement without complete destruction of the compressive strength of the set cement if the diluent does not contain organic chemicals which act as contaminants of cement. However, a very low concentration, usually less than one percent, of some drilling mud additives may contaminate cement slurries sufficiently to prevent setting of the cement.

Recently there has been a marked change in the compositions of drilling muds used in the drilling of many wells. Gypsum has been substituted for calcium hydroxide to reduce to a large extent the gelling of muds at high temperatures. Accompanying the change in the source of calcium has been the substitution of very high concentrations of organic mud chemicals such as chrome-lignins, chrome-lignite, ferrochrome lignosulfonates, other lignosulfonates and lignite for the tannins, starches, sodium carboxymethyl cellulose, and lignins formerly used in low concentrations in drilling muds.

In my Patent No. 2,889,228, entitled "Protection of Cements from Effects of Contamination," the incorporation of formaldehyde or a mixture of formaldehyde and water-soluble chromates or dichromates in cement slurries to counteract contamination of chemicals is described. Although the mixture of formaldehyde and water-soluble chromates is effective in protecting cements from the effects of tannins, starches, sodium carboxymethyl cellulose, lignite and lignins that were then used in drilling mud, it is not effective in counteracting the ferrochrome and other lignosulfonates nor the chrome-lignite and chrome-lignins now frequently used in drilling muds.

This invention resides in a method of cementing wells using a novel decontaminant composition comprising formaldehyde and sodium carbonate for incorporation in Portland cements for use in wells having a bottom hole temperature below 200° F. to counteract the effect of ferrochrome and other lignosulfonates as well as chrome-lignite and chrome-lignins on the setting properties of cement slurries. The maximum depth of such wells will depend on the temperature gradient. For convenience in the description of this invention, a temperature gradient of 1.5° F. per 100 feet of depth is assumed and a depth of 8000 feet is assumed for a bottom hole temperature of 200° F. The invention further resides in Portland cement slurries containing the novel decontaminant and is especially useful in the formulation of cement slurries suitable for use in setting casing or plugs in oil and gas wells in which drilling muds containing ferrochrome or other lignosulfonates or chrome-lignite or chrome-lignins have been used in drilling the well.

Cements which can most usefully be protected in accordance with this invention are generally referred to as Portland cements and are designated in the industry as API Class A, Class B, and Class C cements. They are described in detail in API Specification for Oil Well Cements and Cement Additives, API standard 10A, 6th Edition, January 1959, issued by the American Petroleum Institute. As shown in the API publication, Class A, Class B, and Class C cements are similar to ASTM Type 1, ASTM Type 2, and ASTM Type 3, respectively, Portland cement. This invention is also effective in counteracting contamination of cements of API Class D and E, which are designed for use in formations at temperatures above 180° F. The term "Portland cements" is used throughout this specification to define cements of the API classes specified above which can be protected by the incorporation of the mixture of formaldehyde and sodium carbonate in accordance with this invention.

Portland cements are frequently modified by the manufacturers to delay setting of cement slurries and thereby increase the time available for pumping the cement from the well head to the bottom of the well. Modification of the setting characteristics may be made by control of the surface area through variation in grinding of the cement, by variation in the mineral constituents of the cement, or a combination of the two methods. Portland cements modified by either of these methods are identified as unretarded slow setting cements. In addition to controlling the rate of setting of cements by control of the surface area and mineral composition of the cement, small amounts of one or more retarding materials are sometimes added for further increasing the thickening time of a cement slurry. Retarders allow control of, and useful increases in, thickening time under conditions of high temperature and pressure, but do not cause a serious reduction in the rate of strength development of the cement. This invention is useful to combat contamination of retarded cements as well as the unretarded cements because even though the mixture of formaldehyde and sodium carbonate tends to counteract the effect of many retarders, it also acts as a retarder as well as a decontaminant for cementing wells at depths up to approximately 8,000 feet.

Portland cements of the types described above are mixed with water in a ratio of approximately 35 to 55 percent by weight of water, based on the dry cement, to prepare a cement slurry which can be used in oil and gas well cementing operations. The minimum amount of water used is determined by the pumpability of the slurry, while the maximum concentration of water is usually limited by settling of the cement solids from the water.

In the casing setting and plug setting operations described previously, it is generally desirable to have a minimum of two hours during which the cement slurry is sufficiently fluid to allow it to be pumped down the well and displaced to the desired location in the well. A three-hour period during which the cement is pumpable is preferred. The length of time during which the cement is sufficiently fluid to be pumped is indicated by the time required for the viscosity of an uncontaminated cement slurry to reach 100 poises, which time is generally referred to as the thickening time of the cement slurry. Standard Thickening-Time Tests are described in the API publication, API RP 10B, Eleventh Edition, March 1962, entitled "API Recommended Practice for Testing Oil-Well Cements and Cement Additives." In those tests, viscosities of cement slurries are measured continuously while the temperature and pressure of the cement are increased in accordance with a predetermined schedule.

The formaldehyde in the mixture added to the cement to counteract contamination with organic chemicals can be either in the form of formaldehyde or paraformaldehyde. It is believed that the active form is formaldehyde and that paroformaldehyde, which is a dry powder consisting of a mixture of polyoxymethylene glycols, is converted to formaldehyde upon introduction into a Portland cement slurry. The use of paraformaldehyde is advantageous because it is a solid material which can be mixed with Portland cement in bulk mixing operations and is not destroyed upon subsequent storing. Throughout this specification, the term "formaldehyde" is used to refer to both formaldehyde and paraformaldehyde.

Formaldehyde is incorporated in the Portland cement in a concentration in the range of 0.2 to 3.0 percent by weight of the dry cement. A preferred concentration is about 1.0 percent. Higher concentrations of formaldehyde than 3.0 percent can be used but increase the tendency of the slurries to entrain air and add to the cost of the slurries. Concentrations of formaldehyde lower than 0.5 percent counteract contaminants in cements, but may not be adequate to counteract the effect of contaminants present in drilling mud in severe cases of dilution of the cement slurry with drilling mud. The concentration of the sodium carbonate may range from approximately 0.05 percent to 0.6 percent. The minimum concentration of sodium carbonate is, as a practical matter, determined largely by the ability of the mixing equipment available to disperse the sodium carbonate throughout the cement. Although concentrations of 0.05 percent are effective, it is doubtful that the well service companies could be relied upon to distribute so small an amount uniformly throughout the cement; hence, a preferred concentration of sodium carbonate is about 0.2 percent by weight of the dry cement to insure an adequate amount of sodium carbonate where contamination occurs. Thus, the ratio of formaldehyde to sodium carbonate may range from about 60:1 to 1:3. Concentrations of sodium carbonate higher than 0.6 percent may cause undesirable reactions between the sodium carbonate and the cement. In some instances sodium hydroxide can be substituted for the sodium carbonate, but sodium hydroxide is erratic in its behavior and is not as efficient as sodium carbonate. The formaldehyde and sodium carbonate can be added to dry cement in bulk mixing plants or can be added at the well site directly to the cement slurry. A preferred method of preparing a cement slurry protected against contamination is to add one pound of paraformaldehyde and 0.2 pound of sodium carbonate per 94 pound bag of cement with the mixing water at the well site.

The effectiveness of the formaldehyde and sodium carbonate composition in overcoming the effects of ferrochrome lignosulfonates on the setting properties of cement slurries is illustrated by the following tests.

A water-base drilling mud free of organic treating materials, identified as Mud 1, was prepared having a composition typical of a gypsum base mud. Its composition in pounds per barrel was as follows:

| | |
|---|---|
| Bentonite | 15 |
| Low-yield clay | 31 |
| Gypsum | 5 |
| Calcium carbonate | 1.75 |
| Sodium chloride | 0.87 |

Another mud, identified as Mud 2, was prepared by the addition of Q'Broxir (a registered trade-mark of Puget Sound Pulp and Timber Company), a ferrochrome lignosulfonate, to Mud 1 in a concentration of 15 pounds per barrel of mud.

A series of samples of 46 percent (46 percent water, by weight of the dry cement) Portland cement slurries was prepared from Lone Star API Class A cement. Some of the samples were diluted with 20 percent of Mud 1 and others were diluted and contaminated with 20 percent of Mud 2. (Dilution of cement slurries with 20 percent, by weight of the cement, drilling mud containing 15 pounds per barrel of a contaminant introduces into the cement approximately one percent contaminant.) Separate samples of the diluted and the diluted and contaminated cement slurries were treated with one percent paraformaldehyde or one percent paraformaldehyde and 0.2 percent $Na_2CO_3$, as indicated in the following Table I. The samples were then poured into molds and cured under a pressure of 3,000 pounds per square inch at a temperature of 140° F., the temperature specified in API RP 10B for a well of 4,000 foot depth. The compressive strength of the cement blocks was determined after 24 hours of curing. Results of the tests are presented in Table I:

TABLE I

*Cured at 140° F.*

| Test No. | $HO \cdot (CH_2O)_n \cdot H$ (percent) | $Na_2CO_3$ (percent) | Mud addition | 24 hr. comp. strength (p.s.i.) |
|---|---|---|---|---|
| 1 | 1.0 | 0.2 | 20% No. 1 | 1,937 |
| 2 | 0 | 0 | 20% No. 2 | 0 |
| 3 | 1.0 | 0 | 20% No. 2 | 0 |
| 4 | 1.0 | 0.2 | 20% No. 2 | 1,030 |

The compressive strength of 1937 pounds per square inch for Test No. 1, in which the mud diluting the cement slurry contained no ferrochrome lignosulfonate, indicates the compressive strength of cement prepared from a slurry diluted with mud and treated with the formaldehyde and sodium carbonate mixture. Test No. 2 shows that contamination of the cement slurry with ferrochrome lignosulfonate in Mud 2 caused complete destruction of the compressive strength of the cement. Test No. 3 shows that formaldehyde alone is not effective at 140° F. in counteracting the contamination of the cement slurry but, as shown in Test No. 4, the addition of sodium carbonate and formaldehyde resulted in the cement having a compressive strength of 1030 pounds per square inch.

The tests described for Table I were repeated, with the exception that the curing was at a temperature of 170° F. in accordance with the well simulation test for a depth of 6000 feet. In addition, one cement slurry sample was prepared containing 0.2 percent sodium carbonate and no formaldehyde. The results of the tests are indicated in Table II:

TABLE II

*Cured at 170° F.*

| Test No. | $HO \cdot (CH_2O)_n \cdot H$ (percent) | $Na_2CO_3$ (percent) | Mud addition | 24 hr. comp. strength (p.s.i.) |
|---|---|---|---|---|
| 5 | 0 | 0 | 20% No. 1 | 3,425 |
| 6 | 1.0 | 0.2 | 20% No. 1 | 2,625 |
| 7 | 0 | 0 | 20% No. 2 | 0 |
| 8 | 0 | 0.2 | 20% No. 2 | 0 |
| 9 | 1.0 | 0 | 20% No. 2 | 1,062 |
| 10 | 1.0 | 0.2 | 20% No. 2 | 2,455 |

The compressive strength of 3425 pounds per square inch for Test No. 5 is the strength of a cement slurry diluted with a drilling mud containing no contaminants. The retarding effect of the addition of formaldehyde and sodium carbonate is illustrated in Test No. 6 which shows a reduction in compressive strength to 2625 pounds per square inch. Although the addition of formaldehyde and sodium carbonate to the cement causes a reduction in the compressive strength of the cement, that reduction does not interfere with the use of the cement. Compressive strengths as low as about 500 p.s.i. are adequate for setting casing and liners. Compressive strengths in the range of 1000 to 1500 p.s.i. are adequate in plugs set in holes for subsequent directional drilling.

Test No. 7 shows that the presence of ferrochrome lignosulfonate in the drilling mud used to dilute the cement slurry completely destroys the compressive strength of the cement, and Test No. 8 shows that the incorporation of 0.2 percent sodium carbonate alone has no effect on increasing the strength after 24 hours of cooling. Because of the high temperature of 170° F., formaldehyde alone has some ability to counteract the contaminants as shown by Test No. 9; however, the addition of 0.2 percent sodium carbonate and one percent paraformaldehyde to the cement slurry resulted in substantially complete elimination of the effects of the contaminant, as shown by a comparison of the 24-hour strength of Tests Nos. 6 and 10.

Another series of tests was performed which differed from the tests described with reference to Table I in that the curing temperature was 200° F., which corresponded to a simulated well cementing test for a depth of 8,000 feet. The results are shown in Table III.

TABLE III

*Cured at 200° F.*

| Test No. | $HO \cdot (CH_2O)_n \cdot H$ (percent) | $Na_2CO_3$ (percent) | Mud addition | 24 hr. comp. strength (p.s.i.) |
|---|---|---|---|---|
| 11 | 0 | 0.2 | 20% No. 1 | 1,925 |
| 12 | 1.0 | 0 | 20% No. 2 | 0 |
| 13 | 1.0 | 0 | 20% No. 2 | 1,930 |
| 14 | 1.0 | 0.2 | 20% No. 2 | 2,455 |

It will be noted that at the high temperature of tests described in Table III, the addition of formaldehyde alone to the contaminated cement resulted in a compressive strength substantially identical to the strength of the cement that was diluted but not contaminated. The incorporation of one percent formaldehyde and 0.2 percent sodium carbonate resulted in a 24-hour compressive strength higher than the diluted but uncontaminated cement. It is apparent from Tables II and III that at temperatures above approximately 180° F., formaldehyde alone is effective in counteracting the contaminating effect of ferrochrome lignosulfonates insofar as the compressive strength of the cured cement is concerned.

Underground formations at the high temperatures employed in the tests for Tables II and III are necessarily at substantial depths. It is imperative that the cement slurries used in cementing operations at those depths not only have adequate strength but remain pumpable for a period long enough to allow the cement to be pumped down the well to the desired location. A minimum thickening time for setting a plug or casing at a depth of 8,000 feet is about 2 hours, and it is preferred that the thickening time be close to 3 hours. A series of tests was run on uncontaminated 50 percent water slurries of Lone Star API Class A cement to determine the thickening time of the cement slurries. The tests were run in accordance with the thickening time test procedure described in the API bulletin entitled "Recommended Practice for Testing Oil Well Cement and Cement Additives" (API RP 10B, 11th edition, March 1962). The temperature and pressure were controlled in accordance with Schedules 3, 5, and 7 of that publication, depending upon the depth of the simulated casing setting. Tests were made on uncontaminated neat cement slurries, uncontaminated cement slurries containing one percent formaldehyde, and uncontaminated cement slurries containing one percent formaldehyde and 0.2 percent sodium carbonate. The results of the tests are presented in the following Table IV:

TABLE IV

| Test No. | Depth (feet) | $HO \cdot (CH_2O)_n \cdot H$ (percent) | $Na_2CO_3$ (percent) | Time to 100 poise (minutes) |
|---|---|---|---|---|
| 15 | 4,000 | 0 | 0 | 196 |
| 16 | 8,000 | 0 | 0 | 98 |
| 17 | 12,000 | 0 | 0 | 54 |
| 18 | 4,000 | 1.0 | 0 | 203 |
| 19 | 8,000 | 1.0 | 0 | 108 |
| 20 | 12,000 | 1.0 | 0 | 70 |
| 21 | 4,000 | 1.0 | 0.2 | 234 |
| 22 | 8,000 | 1.0 | 0.2 | 129 |
| 23 | 12,000 | 1.0 | 0.2 | 68 |

Test No. 19 in Table IV shows that a cement containing one percent formaldehyde has a thickening time of 108 minutes in a simulated 8,000 foot test. The addition of 0.2 percent sodium carbonate increased the thickening time to 129 minutes, which is above the minimum time of two hours. The thickening time tests are made with a schedule for increasing the temperature which results in an average and final temperature substantially lower than the formation temperature for the depth the test is designed to simulate. For example, the maximum temperature in an 8,000 foot API Casing Cementing Simulation Test in accordance with Schedule 5 of the API specifications is 125° F., whereas the formation temperature at a depth of 8,000 feet and the maximum curing temperature in the strength tests of Table III is approximately 200° F. The thickening time of 129 minutes for Test No. 22 indicates a depth of 8,000 feet is approximately the upper limit at which the formaldehyde-sodium carbonate composition of this invention has utility.

The ability of the formaldehyde and sodium carbonate to counteract the effects of ferrochrome lignosulfonate on thickening time is illustrated by a series of thickening time tests on cement slurries to which ferrochrome lignosulfonate had been added. Fifty percent slurries of Lone Star API Class A cement were prepared containing one percent Q'Broxin, a ferrochrome lignosulfonate. The slurries were tested in 12,000 foot simulated casing setting tests in accordance with Schedule 7 of API RP 10B, which was based on a formation temperature increase of 1.5° for every 100 feet of depth. The maximum temperature in the test was 172° F.

TABLE V

| Test No. | Depth (feet) | HO·(CH$_2$O)$_n$·H (percent) | Na$_2$CO$_3$ (percent) | Q'Broxin (percent) | Time to 100 poise (minutes) |
|---|---|---|---|---|---|
| 24 | 12,000 | 0 | 0 | 1.0 | 480+ |
| 25 | 12,000 | 1.0 | 0 | 1.0 | 480+ |
| 26 | 12,000 | 1.0 | 0.2 | 1.0 | 24 |
| 27 | 8,000 | 1.0 | 0.2 | 1.0 | 25 |

Test No. 25 shows that formaldehyde alone had no effect during the period of the test on thickening time of the cement slurry contaminated with ferrochrome lignosulfonate. The addition of formaldehyde and sodium carbonate counteracted the contamination of the ferrochrome lignosulfonate and produced a strong acceleration of the setting of the cement as shown by Tests Nos. 26 and 27. The very short setting periods for Tests Nos. 26 and 27 are not an indication that the cement slurries are not suitable for use in the field. Contamination of the cement is serious only after the cement is discharged from the tubing or casing through which it is pumped to the bottom of the well. Moreover, if the contamination is the result of dilution of the cement with drilling mud, the acceleration indicated by Tests Nos. 26 and 27 shows up only as a slight gelling which does not jeopardize pulling tubing from the plug.

The mixture of formaldehyde and sodium carbonate herein described is highly effective in overcoming the set-preventing effects of ferrochrome lignosulfonate, chrome-lignins, and chrome-lignite when added to Portland cement slurries. A mixture of formaldehyde and sodium carbonate is also effective in retarding the setting of Portland cement slurries to give the slurries thickening times adequate to permit the slurries to be pumped down wells to formations at temperatures not exceeding 200° F.

I claim:
1. A process for cementing oil and gas wells having a bottom hole temperature below 200° F. and containing a drilling mud which includes an organic drilling mud additive selected from the group consisting of ferrochrome lignosulfonates, chrome-lignite, and chrome-lignins which retard the set of cements, comprising forming a pumpable cement slurry of Portland cement, water, formaldehyde, and sodium carbonate, the concentration of water in the slurry being about 35 to 55 percent by weight of the Portland cement, the concentration of formaldehyde in the slurry being about 0.2 to 3 percent by weight of the Portland cement, and the concentration of sodium carbonate being about 0.05 to 0.6 percent by wegiht of the Portland cement, displacing the slurry down the well into the space to be cemented, and maintaining the cement slurry in the space to be cemented until the cement sets.

2. A process as set forth in claim 1 in which the drilling mud additive is ferrochrome lignosulfonates.

References Cited by the Examiner

UNITED STATES PATENTS 2,889,228    6/59    Beach _____ 106—93

FOREIGN PATENTS 667,261    2/52    Great Britain.

OTHER REFERENCES

Lea et al.: Chemistry of Cement and Concrete, Edward Arnold and Co., London, 1935, pp. 190 and 191.

TOBIAS E. LEVOW, *Primary Examiner.*

---

UNITED STATES PATENT OFFICE
CERTIFICATE OF CORRECTION

Patent No. 3,190,356                June 22, 1965

Horace J. Beach

It is hereby certified that error appears in the above numbered patent requiring correction and that the said Letters Patent should read as corrected below.

Column 1, line 29, before "the" insert -- of --; column 3, line 42, for "paroformaldehyde" read -- paraformaldehyde --; column 4, line 29, for "Q'Broxir" read -- Q'Broxin --; column 5, line 41, for "on" read -- of --; same column 5, TABLE III, second column, line 1 thereof, for "0" read -- 1.0 --; same TABLE III, second column, line 2 thereof, for "1.0" read -- 0 --; column 8, line 16, for "wegiht" read -- weight --.

Signed and sealed this 30th day of November 1965.

(SEAL)
Attest:

ERNEST W. SWIDER                              EDWARD J. BRENNER
Attesting Officer                                    Commissioner of Patents

UNITED STATES PATENT OFFICE
CERTIFICATE OF CORRECTION

Patent No. 3,190,356

June 22, 1965

Horace J. Beach

It is hereby certified that error appears in the above numbered patent requiring correction and that the said Letters Patent should read as corrected below.

Column 1, line 29, before "the" insert -- of --; column 3, line 42, for "paroformaldehyde" read -- paraformaldehyde --; column 4, line 29, for "Q'Broxir" read -- Q'Broxin --; column 5 line 41, for "on" read -- of --; same column 5, TABLE III, second column, line 1 thereof, for "0" read -- 1.0 --; same TABLE III, second column, line 2 thereof, for "1.0" read -- 0 -- column 8, line 16, for "wegiht" read -- weight --.

Signed and sealed this 30th day of November 1965.

(SEAL)
Attest:

ERNEST W. SWIDER
Attesting Officer

EDWARD J. BRENNER
Commissioner of Patents